US008744508B2

(12) United States Patent
Chen

(10) Patent No.: US 8,744,508 B2
(45) Date of Patent: Jun. 3, 2014

(54) APPARATUSES, SYSTEMS, AND METHODS FOR CONNECTION ESTABLISHMENT

(75) Inventor: Po-Han Chen, Taipei Hsien (TW)

(73) Assignee: Acer Incorporated, Taipei Hsien (TW)

(*) Notice: Subject to any disclaimer, the term of this patent is extended or adjusted under 35 U.S.C. 154(b) by 337 days.

(21) Appl. No.: 13/097,544

(22) Filed: Apr. 29, 2011

(65) Prior Publication Data

US 2012/0094707 A1    Apr. 19, 2012

(30) Foreign Application Priority Data

Oct. 15, 2010  (TW) .............................. 99135179 A

(51) Int. Cl.
*H04W 76/02*    (2009.01)
(52) U.S. Cl.
USPC .................. 455/517; 455/422.1; 370/329
(58) Field of Classification Search
CPC ........................... H04W 76/02; H04W 76/027
USPC ........................................................ 455/517
See application file for complete search history.

(56) References Cited

U.S. PATENT DOCUMENTS

| | | | | |
|---|---|---|---|---|
| 6,330,313 B1* | 12/2001 | Hunt | | 379/133 |
| 6,996,060 B1* | 2/2006 | Dahlby et al. | | 370/230 |
| 7,363,047 B2* | 4/2008 | Yi et al. | | 455/515 |
| 7,493,108 B2* | 2/2009 | Beming et al. | | 455/418 |
| 7,864,726 B2* | 1/2011 | Lee et al. | | 370/328 |
| 8,014,347 B2* | 9/2011 | Lee et al. | | 370/328 |
| 8,014,772 B2* | 9/2011 | Beming et al. | | 455/432.1 |
| 8,498,212 B2* | 7/2013 | Lin et al. | | 370/241 |
| 8,570,953 B2* | 10/2013 | Kuo et al. | | 370/329 |
| 2006/0034204 A1* | 2/2006 | Lee et al. | | 370/312 |
| 2008/0025314 A1* | 1/2008 | Lee et al. | | 370/394 |
| 2008/0192688 A1* | 8/2008 | Kuo et al. | | 370/329 |
| 2008/0267061 A1* | 10/2008 | DiGirolamo et al. | | 370/216 |
| 2008/0311923 A1* | 12/2008 | Petrovic et al. | | 455/450 |
| 2009/0023470 A1* | 1/2009 | Fujimoto | | 455/552.1 |
| 2010/0067498 A1 | 3/2010 | Lee et al. | | |
| 2010/0142456 A1* | 6/2010 | Lee et al. | | 370/329 |
| 2010/0329167 A1* | 12/2010 | Linden et al. | | 370/312 |

(Continued)

FOREIGN PATENT DOCUMENTS

| | | |
|---|---|---|
| CN | 101690344 | 3/2010 |
| CN | 102457939 | 5/2012 |
| WO | WO 2009/133599 | 11/2009 |

OTHER PUBLICATIONS

Taiwanese language Notice of Allowance dated Nov. 22, 2013.

(Continued)

*Primary Examiner* — Hai V Nguyen
(74) *Attorney, Agent, or Firm* — McClure, Qualey & Rodack, LLP

(57) ABSTRACT

A wireless communications device with a wireless module and a controller module is provided. The wireless module performs wireless transceiving to and from a service network. The controller module transmits a connection request message to the service network via the wireless module, and receives, on a downlink shared channel, a connection rejection message corresponding to the connection request message from the service network via the wireless module. Also, the controller module determines whether the connection rejection message indicates that congestion has occurred on the downlink shared channel, and retransmits the connection request message and waits to receive, on a forward access channel, a subsequent response message from the service network via the wireless module, in response to the connection rejection message indicating that congestion has occurred on the downlink shared channel.

18 Claims, 6 Drawing Sheets

(56) References Cited

U.S. PATENT DOCUMENTS

| | | | |
|---|---|---|---|
| 2010/0329182 A1* | 12/2010 | Wigard et al. | 370/328 |
| 2011/0019633 A1* | 1/2011 | Tajima et al. | 370/329 |
| 2011/0044274 A1* | 2/2011 | Lee et al. | 370/329 |
| 2011/0122783 A1* | 5/2011 | Lin et al. | 370/252 |
| 2011/0122802 A1* | 5/2011 | Ueda et al. | 370/310.1 |
| 2011/0134757 A1* | 6/2011 | Lin et al. | 370/241 |
| 2011/0230179 A1* | 9/2011 | Lee et al. | 455/422.1 |
| 2011/0269463 A1* | 11/2011 | Wang et al. | 455/436 |
| 2012/0002545 A1* | 1/2012 | Watfa et al. | 370/235 |
| 2012/0026903 A1* | 2/2012 | Song et al. | 370/252 |
| 2012/0088495 A1* | 4/2012 | Tsai | 455/422.1 |
| 2013/0053045 A1* | 2/2013 | Chuang | 455/440 |
| 2013/0064167 A1* | 3/2013 | Worrall | 370/312 |
| 2013/0143547 A1* | 6/2013 | Ye | 455/422.1 |
| 2013/0157608 A1* | 6/2013 | Chuang | 455/404.1 |
| 2013/0176976 A1* | 7/2013 | Balakrishnan et al. | 370/329 |

OTHER PUBLICATIONS

Chinese language office action dated Jan. 17, 2014.
English language translation of abstract of CN 101690344 (published Mar. 31, 2010).
English language translation of abstract of CN 102457939 (published May 15, 2012).

* cited by examiner

APPARATUSES, SYSTEMS, AND METHODS FOR CONNECTION ESTABLISHMENT

CROSS REFERENCE TO RELATED APPLICATIONS

This Application claims priority of Taiwan Patent Application No. 99135179, filed on Oct. 15, 2010, the entirety of which is incorporated by reference herein.

BACKGROUND OF THE INVENTION

1. Field of the Invention

The invention generally relates to the technique of carrier aggregation, and more particularly, to wireless apparatuses, wireless systems, and methods for managing the activation and deactivation of multiple component carriers.

2. Description of the Related Art

The Universal Mobile Telecommunications System (UMTS), which evolved from the Global System for Mobile communications (GSM) and belongs to one of the third-generation (3G) mobile communication technologies, utilizes the core network of the GSM system and Wideband Code Division Multiple Access (WCDMA) technology to provide high transceiving rates and optimal service quality. Generally, in a UMTS system, a mobile communication device, or so-called a User Equipment (UE), has to perform a connection establishment procedure to obtain mobile communication services from a service network.

According to release 7 of the 3rd Generation Partnership Project (3GPP) specifications for the UMTS system, the logical channels comprise a Dedicated CHannel (DCH) and a Downlink Shared CHannel (DSCH). A UE may determine from system broadcasts, whether or not a base station supports the DSCH, and may configure the DSCH as the default downlink channel, if the base station supports the DSCH. To further clarify, in a connection establishment procedure as shown in FIG. 1, a UE first transmits a Radio Resource Control (RRC) CONNECTION REQUEST message to a base station in a service network. In response to the RRC CONNECTION REQUEST message being accepted by the service network, the UE receives an RRC CONNECTION SETUP message from the service network. Next, the UE establishes a connection with the base station according to the configurations indicated in the RRC CONNECTION SETUP message. Note that, since the RRC CONNECTION SETUP message is delivered on the DSCH, the UE needs to monitor the DSCH for receiving subsequent response messages after transmitting of the RRC CONNECTION REQUEST message. After the connection is successfully established, the UE further transmits an RRC CONNECTION SETUP COMPLETE message to the service network, to end the connection establishment procedure.

In another situation where network congestion occurs, the UE may receive an RRC CONNECTION REJECT message instead of the RRC CONNECTION SETUP message, as shown in FIG. 2. However, the RRC CONNECTION REJECT message does not indicate which downlink channel (e.g. the DSCH, DCH, or both) the network congestion has occurred on, according to the release 7 of the 3GPP specifications for the UMTS system. As a result, the UE may only continue to retransmit the RRC CONNECTION REQUEST message for a predetermined number of times, until the RRC CONNECTION SETUP message is received or the predetermined number of times is reached.

BRIEF SUMMARY OF THE INVENTION

Accordingly, embodiments of the invention provide apparatuses, systems, and methods for connection establishment. In one aspect of the invention, a mobile communication device comprising a wireless module and a controller module is provided. The wireless module performs wireless transceiving to and from a service network. The controller module transmits a connection request message to the service network via the wireless module, and receives, on a downlink shared channel, a connection rejection message corresponding to the connection request message from the service network via the wireless module. Also, the controller module determines whether the connection rejection message indicates that congestion has occurred on the downlink shared channel, and in response to the connection rejection message indicating that congestion has occurred on the downlink shared channel, retransmits the connection request message and waits to receive, on a forward access channel, a subsequent response message from the service network via the wireless module.

In another aspect of the invention, a connection establishment method for a mobile communications device comprising a wireless module is provided. The connection establishment method comprises the steps of transmitting a connection request message to the service network via the wireless module, receiving, on a downlink shared channel, a connection rejection message corresponding to the connection request message from the service network via the wireless module, determining whether the connection rejection message indicates that congestion has occurred on the downlink shared channel, and retransmitting the connection request message and waiting to receive, on a forward access channel, a subsequent response message from the service network via the wireless module, in response to the connection rejection message indicating that congestion has occurred on the downlink shared channel.

In another aspect of the invention, a mobile communication system comprising a service network and a mobile communication device is provided. The service network receives a connection request message, transmits, on a downlink shared channel, a connection rejection message corresponding to the connection request message, and transmits a subsequent response message on a forward access channel in response to receiving a retransmission of the connection request message. The mobile communication device transmits the connection request message, and receives the connection rejection message on the downlink shared channel. Also, the mobile communication device determines whether the connection rejection message indicates that congestion has occurred on the downlink shared channel, and retransmits the connection request message and waits to receive the subsequent response message on the forward access channel, in response to the connection rejection message indicating that congestion has occurred on the downlink shared channel.

Other aspects and features of the invention will become apparent to those with ordinary skill in the art upon review of the following descriptions of specific embodiments of the mobile communication device, the service network, and the connection establishment method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
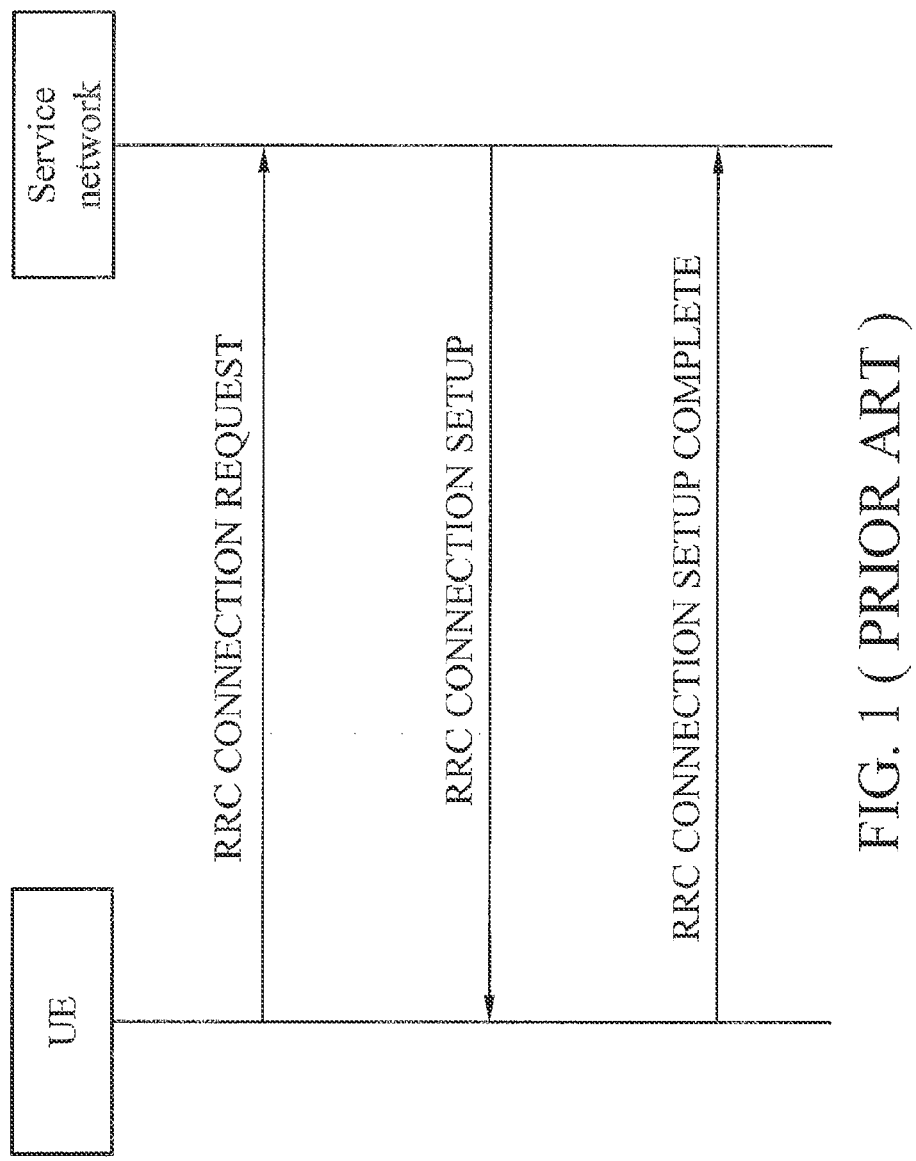
FIG. 1 is a message sequence chart illustrating a connection establishment procedure being accepted by a service network.
Figure 2:
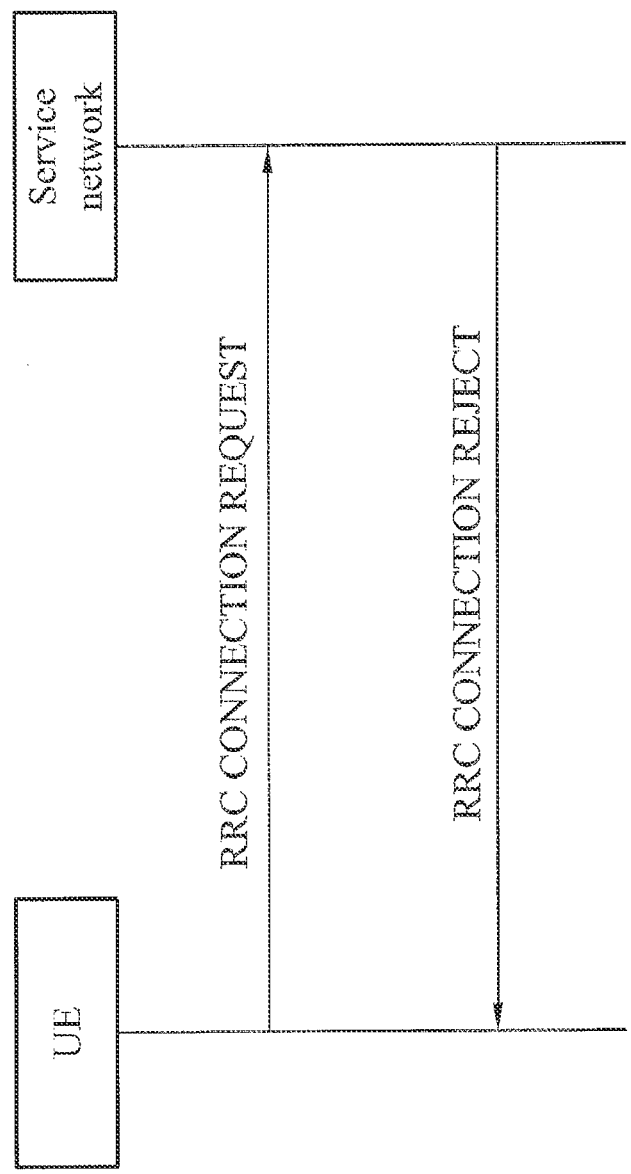
FIG. 2 is a message sequence chart illustrating a connection establishment procedure being rejected by a service network.
Figure 3:
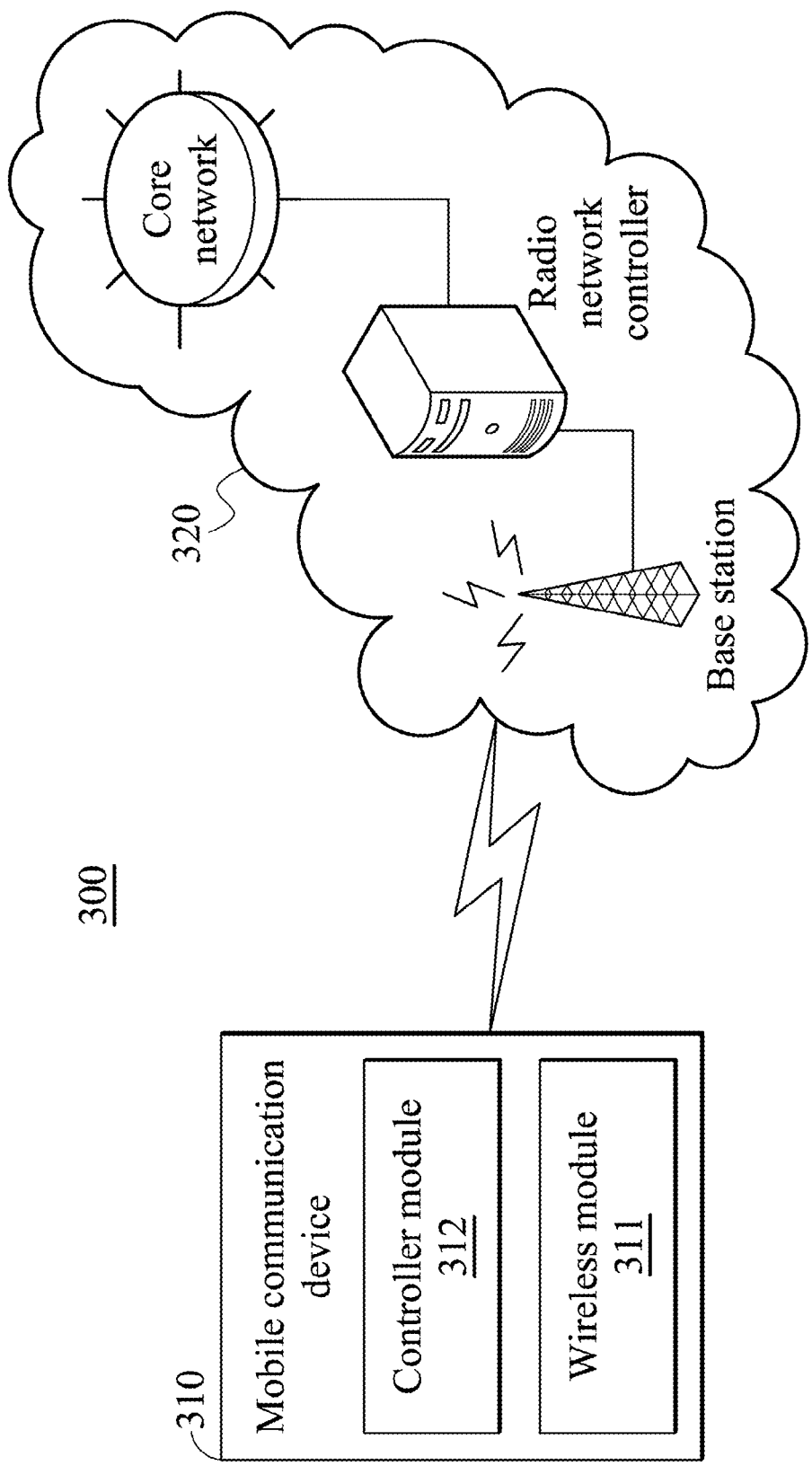
FIG. 3 is a block diagram illustrating a mobile communication system according to an embodiment of the invention.

FIG. 3 is a block diagram illustrating a mobile communication system according to an embodiment of the invention. In the mobile communication system 300, the mobile communication device 310 is wirelessly connected to the service network 320 via the air interface for performing the wireless transmission and receptions therebetween, wherein both of the mobile communication device 310 and the service network 320 support release 7 of the 3GPP specifications for the UMTS system. The mobile communication device 310 comprises a wireless module 311 for performing the functionality of wireless transceiving. To further clarify, the wireless module 311 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA technology, or others depending on the radio access technology (RAT) in use. Also, the mobile communication device 310 comprises a controller module 312 for controlling the operation of the wireless module 311 and other functional components, such as a display unit and/or keypad serving as the MMI (man-machine interface), a storage unit storing the program codes of applications or communication protocols, or others.

To be more specific, the controller module 312 controls the wireless module 311 for performing a contention establishment procedure with the service network 320. After being powered on and successfully completing a series of initialization processes, the controller module 312 may enter an RRC_Idle state and transmit an RRC CONNECTION REQUEST message to the service network 320 via the wireless module 311. Next, the controller module 312 may instruct the wireless module 311 to monitor the DSCH for receiving subsequent response messages from the service network 320. In this embodiment, the service network 320 does not accept the RRC CONNECTION REQUEST message due to the fact that network congestion has occurred on the DSCH for delivering an RRC CONNECTION SETUP message. The service network 320 then may prepare an RRC CONNECTION REJECT message indicating that network congestion has occurred on the DSCH, and transmit the RRC CONNECTION REJECT message to the mobile communication device 310. Note that, the RRC CONNECTION REJECT message in this embodiment is different from the conventional RRC CONNECTION REJECT message, and specific options for indicating the downlink channel on which network congestion has occurred are defined in the field of "rejection cause" as follows.

TABLE 1

| Information Element/Group Name | Need | Type | Description |
| --- | --- | --- | --- |
| Rejection cause | Mandatory Present (MP) | Enumerated (congestion-DSCH, congestion-both, unspecified) | 1. congestion-DSCH: network congestion has occurred on the DSCH 2. congestion-both: network congestion has occurred on the DCH |

When receiving the RRC CONNECTION REJECT message via the wireless module 311, the controller module 312 may determine that the rejection cause in the RRC CONNECTION REJECT message indicates the occurrence of network congestion on the DSCH (i.e. "congestion-DSCH" as listed in Table 1). The controller module 312 may further instruct the wireless module 311 to switch the monitored downlink channel from the DSCH to the FACH, after retransmitting the RRC CONNECTION REQUEST message via the wireless module 311. When receiving the retransmitted RRC CONNECTION REQUEST message, the service network 320 may prepare an RRC CONNECTION SETUP message which includes configurations for the connection to be established, and transmit the RRC CONNECTION SETUP message to the mobile communication device 310. Later, in response to receiving the RRC CONNECTION SETUP message, the controller module 312 may instruct the wireless module 311 to establish the connection with the service network 320 according to the configurations indicated in the RRC CONNECTION SETUP message.

Note that, before performing the connection establishment procedure, the controller module 312 may first receive the System Information Block 5 (SIB-5) broadcasted by the service network 320 via the wireless module 311. In the connection establishment procedure, the controller module 312 may instruct the wireless module 311 to monitor the DSCH according to the configurations indicated in the SIB-5.

In another embodiment, the service network 320 does not accept the RRC CONNECTION REQUEST message due to the fact that network congestion has occurred on both the DSCH and DCH. The service network 320 may then prepare an RRC CONNECTION REJECT message which includes a rejection cause indicating occurrence of network congestion on both the DSCH and DCH (i.e. "congestion-both" as listed in Table 1), and transmit the RRC CONNECTION REJECT message to the mobile communication device 310. Alternatively, the service network 320 may reject the RRC CONNECTION REQUEST message due to other reasons, such as the serving base station being currently under maintenance, and indicate no specific rejection cause in the RRC CONNECTION REJECT message (i.e. "unspecified" as listed in Table 1). For either case, when receiving the RRC CONNECTION REJECT message, the controller module 312 may determine that the rejection cause in the RRC CONNECTION REJECT message indicates the occurrence of network congestion on both the DSCH and DCH, or indicates no specific reason, and then retransmit the RRC CONNECTION REQUEST message via the wireless module 311 and instruct the wireless module 311 to continue monitoring of the DSCH.

In addition, the controller module 312 may count the number of retransmissions of the RRC CONNECTION REQUEST message, and determine whether the count number is less than a predetermined threshold before each retransmission, wherein the predetermined threshold is determined according to the system information broadcasted by the service network 320. That is, the retransmission step may only be performed in response to the count number being less than the predetermined threshold. Otherwise, if the count number is greater than or equal to the predetermined threshold, the controller module 312 may instruct the wireless module 311 to stop monitoring the DSCH and stay in the RRC_Idle state. Specifically, the predetermined threshold may preferably be set to be greater than 1, or may be set to be less than or equal to 1 for the cease the retransmission step. Furthermore, the RRC CONNECTION REJECT message may include a "wait time" field for indicating to the mobile communication device 310 that the retransmission step may only be performed after the time period specified in the "wait time" field. Thus, in addition to determining whether the count number is less than the predetermined threshold and whether the predetermined threshold is greater than 1, the controller module 312 may further determine whether the value of the "wait time" field is 0, so that the retransmission step is only performed in response to the count number being less than the predetermined threshold, the predetermined threshold being greater than 1, and the value of the "wait time" filed not being 0.

In yet another embodiment, the service network 320 may reject the RRC CONNECTION REQUEST message in response to deciding to redirect the mobile communication device 310 to another service network which supports a different RAT. In this case, the service network 320 may include the redirection information in an RRC CONNECTION REJECT message and then transmit the RRC CONNECTION REJECT message to the mobile communication device 310. When receiving the RRC CONNECTION REJECT message, the controller module 312 may determine that the redirection information is included in the RRC CONNECTION REJECT message, and continue to perform a redirection procedure for redirecting to another frequency or another service network supporting another RAT, instead of performing the switching of the monitored downlink channel or the retransmission step. Note that the detailed description of the redirection procedure is omitted herein as it is beyond the scope of the invention.

Figure 4:
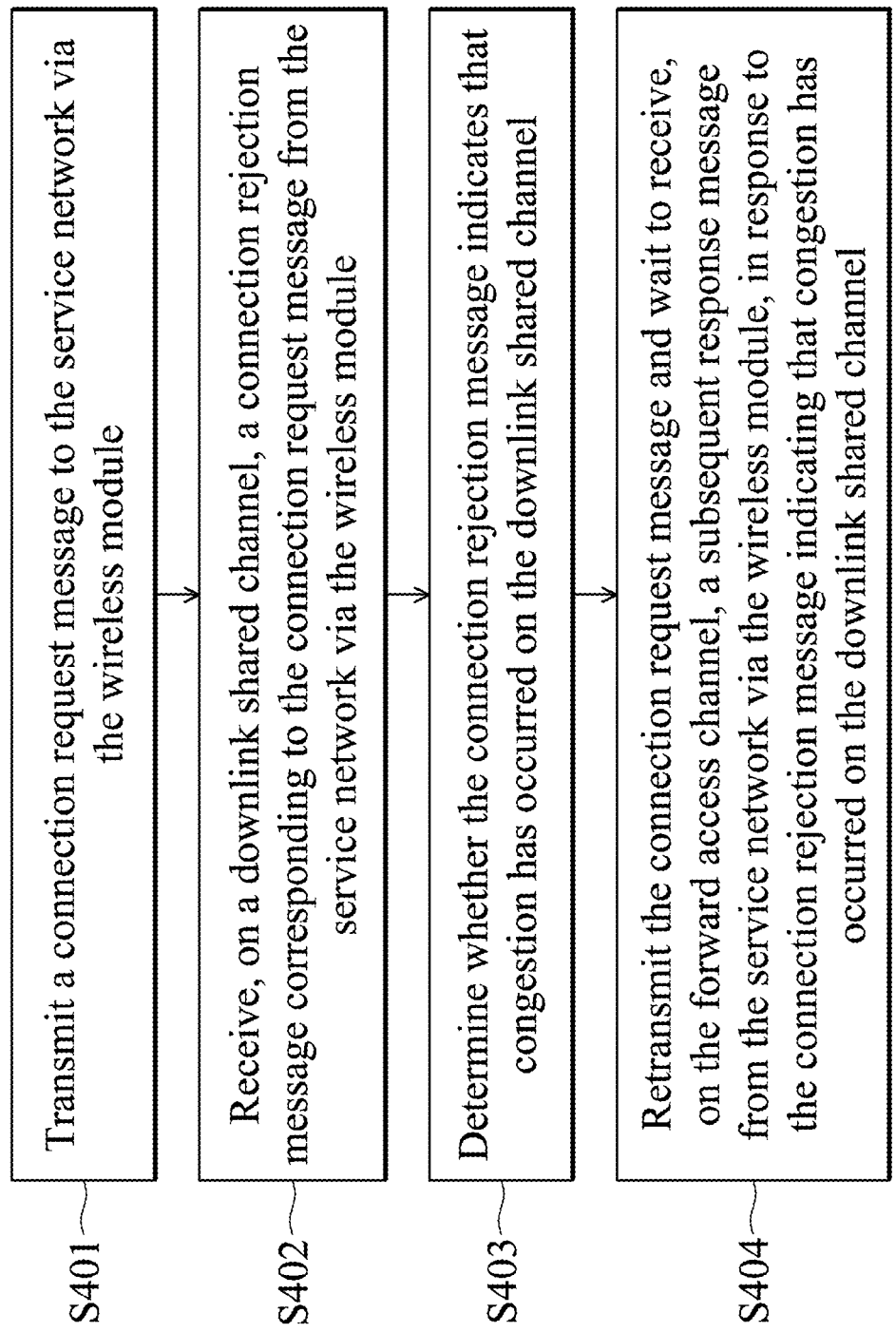
FIG. 4 is a flow chart illustrating a connection establishment method according to an embodiment of the invention.

FIG. 4 is a flow chart illustrating a connection establishment method according to an embodiment of the invention. In this embodiment, the connection establishment method is applied to a mobile communication device wirelessly connected with a service network. To begin, the mobile communication device transmits a connection request message to the service network (step S401), and then receives, on the DSCH, a connection rejection message corresponding to the connection request message from the service network (step S402). Subsequently, the mobile communication device determines whether the connection rejection message indicates that congestion has occurred on the downlink shared channel (step S403). If so, the mobile communication device retransmits the connection request message and waits to receive, on the FACH, a subsequent response message from the service network (step S404). Specifically, if the subsequent response message is a connection setup message, the mobile communication device establishes a connection with the service network according to the connection setup message. Otherwise, if the subsequent response message is another connection rejection message, step S404 is repeated until a connection setup message is received or the number of retransmissions of the connection request message reaches a predetermined threshold.

Figure 5A:
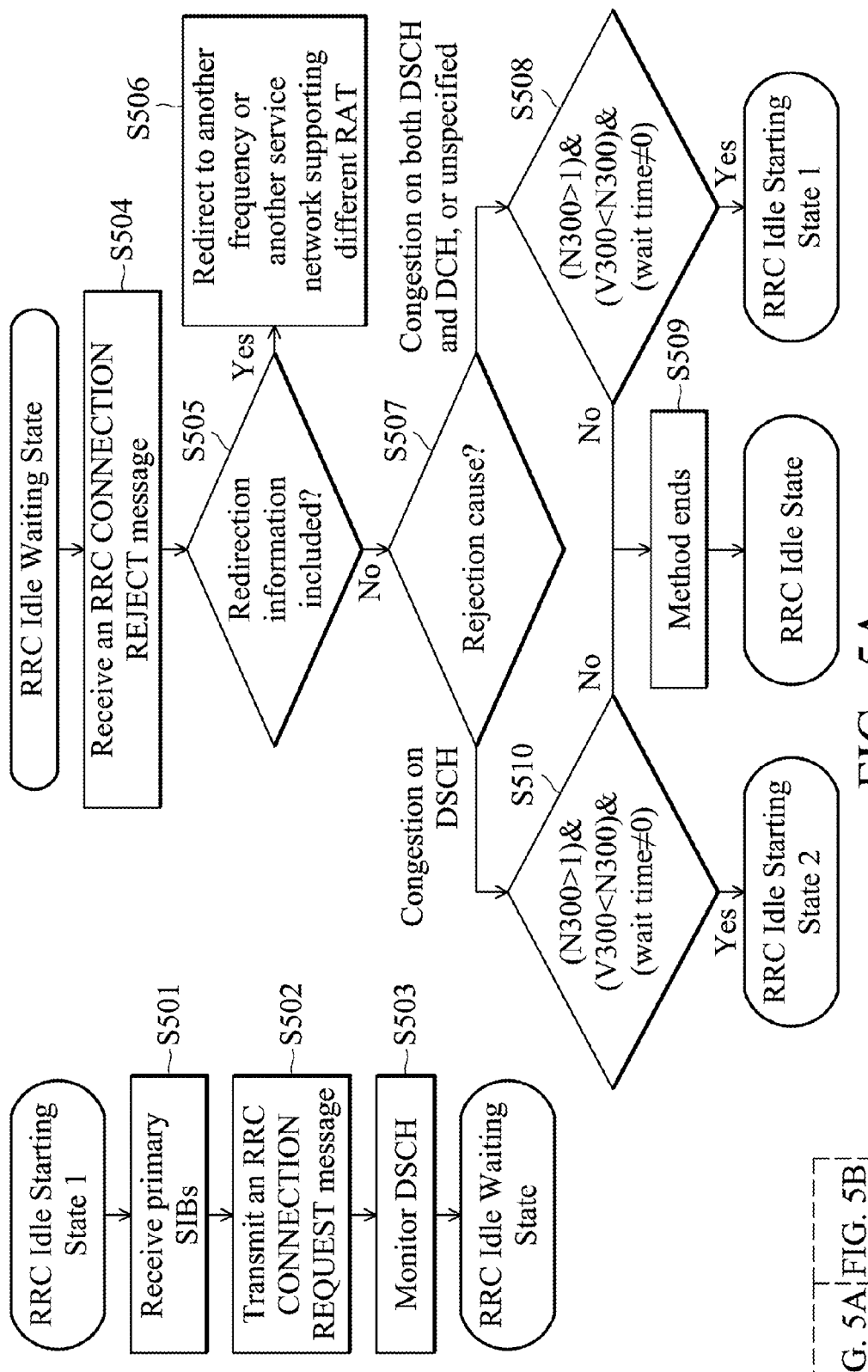
FIGS. 5A and 5B show a flow chart of a connection establishment method according to another embodiment of the invention.
Figure 5B:
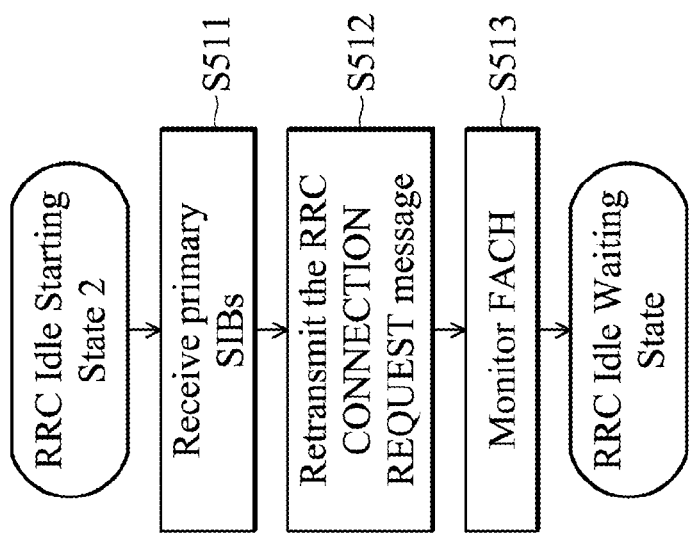

FIGS. 5A and 5B show a flow chart of a connection establishment method according to another embodiment of the invention. In this embodiment, the connection establishment method is applied to a mobile communication device wirelessly connected with a service network, and both of the mobile communication device and the service network support release 7 of the 3GPP specifications for the UMTS system. The mobile communication device 310 and the service network 320 are taken as an example for illustrating the connection establishment method as follows. Initially, the mobile communication device 310 is powered on to perform a series of initialization processes and then enters an RRC_Idle_1 state (denoted as "RRC Idle starting state 1" in FIGS. 5A and 5B). To begin the connection establishment method, the mobile communication device 310 first receives the primary SIBs broadcasted by the service network 320 (step S501). Specifically, the primary SIBs comprise a SIB-5. Next, the mobile communication device 310 transmits an RRC CONNECTION REQUEST message to the service network 320 (step S502), and monitors the DSCH according to the configurations indicated in the SIB-5 (step S503). Subsequently, the mobile communication device 310 enters an RRC_Idle_Waiting state (denoted as "RRC Idle waiting state" in FIGS. 5A and 5B).

Later, the mobile communication device 310 receives, on the DSCH, an RRC CONNECTION REJECT message from the service network 320 (step S504). In response to the RRC CONNECTION REJECT message, the mobile communication device 310 first determines whether the redirection information is included in the RRC CONNECTION REJECT message (step S505). If so, the mobile communication device 310 performs a redirection procedure to redirect to another frequency or another service network supporting an RAT different from the WCDMA technology (step S506). Otherwise, if the RRC CONNECTION REJECT message does not include the redirection information, the mobile communication device 310 then determines the rejection cause from the RRC CONNECTION REJECT message (step S507). If the rejection cause indicates the occurrence of network congestion on both the DSCH and DCH or indicates no specific reason, the mobile communication device 310 determines whether the number of retransmissions of the RRC CONNECTION REQUEST message is less than a predetermined threshold, whether the predetermined threshold is greater than 1, and whether the "wait time" field in the RRC CONNECTION REJECT message indicates a non-zero value (step S508). If so, the mobile communication device 310 goes back to the RRC_Idle_1 state, and as described above, the mobile communication device 310 may receive the updated primary SIBs due to possible updates to one or more of the primary SIBs broadcasted by the service network 320 (step S501). After waiting for a period of time indicated in the "wait time" field, the mobile communication device 310 may retransmit the RRC CONNECTION REQUEST message (step S502), and continue monitoring of the DSCH for receiving a subsequent response message from the service network 320 (step S503). Subsequent to step S508, if one of the determinations fails, the connection establishment method ends (step S509), and the mobile communication device 310 enters an RRC_Idle state (denoted as "RRC Idle state" in FIGS. 5A and 5B).

Subsequent to step S507, if the rejection cause indicates the occurrence of network congestion on the DSCH, the mobile communication device 310 then determines whether the number of retransmissions of the RRC CONNECTION REQUEST message is less than the predetermined threshold, whether the predetermined threshold is greater than 1, and whether the "wait time" field in the RRC CONNECTION REJECT message indicates a non-zero value (step S510). If so, the mobile communication device 310 enters the RRC_Idle_2 state (denoted as "RRC Idle starting state 2" in FIGS. 5A and 5B). When in the RRC_Idle_2 state, the mobile communication device 310 may receive the updated primary SIBs due to possible updates to one or more of the primary SIBs broadcasted by the service network 320 (step S511), and retransmit the RRC CONNECTION REQUEST message after waiting for a period of time indicated in the "wait time" field (step S512). Lastly, the mobile communication device 310 switches to the monitored downlink channel from the DSCH to the FACH (step S513), and then enters the RRC_Idle_Waiting state for receiving a subsequent response message from the service network 320. Subsequent to step S510, if one of the determinations fails, the connection establishment method ends (step S509), and the mobile communication device 310 enters an RRC_Idle state.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communications device, comprising:
    a wireless module, performing wireless transceiving to and from a service network; and
    a controller module, transmitting a connection request message to the service network via the wireless module, receiving, on a downlink shared channel, a connection rejection message corresponding to the connection request message from the service network via the wireless module, determining whether the connection rejection message indicates that congestion has occurred on the downlink shared channel, and in response to the connection rejection message indicating that congestion has occurred on the downlink shared channel, retransmitting the connection request message and waiting to receive, on a forward access channel, a subsequent response message from the service network via the wireless module.

2. The mobile communications device of claim 1, wherein the controller module further determines whether a retry counter for retransmitting the connection request message is less than a predetermined threshold, prior to the retransmission of the connection request message, and the retransmission of the connection request message and the waiting for the subsequent response message on the forward access channel are performed in response to the retry counter being less than the predetermined threshold, and the controller module further enters an idle state in response to the retry counter being equal to or greater than the predetermined threshold.

3. The mobile communications device of claim 1, wherein the controller module further retransmits the connection request message and waits to receive, on the downlink shared channel, the subsequent response message from the service network via the wireless module, in response to the connection rejection message indicating that congestion has occurred on both of the downlink shared channel and the forward access channel, or not indicating any information concerning congestion.

4. The mobile communications device of claim 3, wherein the controller module further determines whether a retry counter for retransmitting the connection request message is less than a predetermined threshold, prior to the retransmission of the connection request message, and the retransmission of the connection request message and the waiting for the subsequent response message on the downlink shared channel are performed in response to the retry counter being less than the predetermined threshold, and the controller module further enters an idle state in response to the retry counter being equal to or greater than the predetermined threshold.

5. The mobile communications device of claim 1, wherein the controller module further receives a system information broadcast comprising configuration information of the downlink shared channel from the service network via the wireless module, and instructs the wireless module to perform the waiting for the subsequent response message on the downlink shared channel according to the configuration information.

6. The mobile communications device of claim 1, wherein, in response to the subsequent response message being a connection setup message, the controller module further instructs the wireless module to establish a connection with the service network according to the connection setup message.

7. A connection establishment method for a mobile communications device comprising a wireless module, comprising:
    transmitting a connection request message to a service network via the wireless module;
    receiving, on a downlink shared channel, a connection rejection message corresponding to the connection request message from the service network via the wireless module;
    determining whether the connection rejection message indicates that congestion has occurred on the downlink shared channel; and
    retransmitting the connection request message and waiting to receive, on a forward access channel, a subsequent response message from the service network via the wireless module, in response to the connection rejection message indicating that congestion has occurred on the downlink shared channel.

8. The connection establishment method of claim 7, further comprising determining whether a retry counter for retransmitting the connection request message is less than a predetermined threshold, prior to the retransmission of the connection request message, wherein the retransmission of the connection request message and the waiting for the subsequent response message on the forward access channel are performed in response to the retry counter being less than the predetermined threshold, and the connection establishment method further comprises entering an idle state in response to the retry counter being equal to or greater than the predetermined threshold.

9. The connection establishment method of claim 7, further comprising retransmitting the connection request message and waiting to receive, on the downlink shared channel, the subsequent response message from the service network via the wireless module, in response to the connection rejection message indicating that congestion has occurred on both of the downlink shared channel and the forward access channel, or not indicating any information concerning congestion.

10. The connection establishment method of claim 9, further comprising determining whether a retry counter for retransmitting the connection request message is less than a predetermined threshold, prior to the retransmission of the connection request message, wherein the retransmission of the connection request message and the waiting for the subsequent response message on the downlink shared channel are performed in response to the retry counter being less than the predetermined threshold, and the connection establishment method further comprises entering an idle state in response to the retry counter being equal to or greater than the predetermined threshold.

11. The connection establishment method of claim 7, further comprising receiving a system information broadcast comprising configuration information of the downlink shared channel from the service network via the wireless module, and instructing the wireless module to perform the waiting for the subsequent response message on the downlink shared channel according to the configuration information.

12. The connection establishment method of claim 7, further comprising, in response to the subsequent response message being a connection setup message, instructing the wireless module to establish a connection with the service network according to the connection setup message.

13. A mobile communication system, comprising:
a service network, receiving a connection request message, transmitting, on a downlink shared channel, a connection rejection message corresponding to the connection request message, and transmitting a subsequent response message on a forward access channel in response to receiving a retransmission of the connection request message; and
a mobile communication device, transmitting the connection request message, receiving the connection rejection message on the downlink shared channel, determining whether the connection rejection message indicates that congestion has occurred on the downlink shared channel, and retransmitting the connection request message and waiting to receive the subsequent response message on the forward access channel, in response to the connection rejection message indicating that congestion has occurred on the downlink shared channel.

14. The mobile communication system of claim 13, wherein the mobile communication device further determines whether a retry counter for retransmitting the connection request message is less than a predetermined threshold, prior to the retransmission of the connection request message, and the retransmission of the connection request message and the waiting for the subsequent response message on the forward access channel are performed in response to the retry counter being less than the predetermined threshold, and the mobile communication device further enters an idle state in response to the retry counter being equal to or greater than the predetermined threshold.

15. The mobile communication system of claim 13, wherein the mobile communication device further retransmits the connection request message and waits to receive, on the downlink shared channel, the subsequent response message from the service network, in response to the connection rejection message indicating that congestion has occurred on both of the downlink shared channel and the forward access channel or not indicating any information concerning congestion.

16. The mobile communication system of claim 15, wherein the mobile communication device further determines whether a retry counter for retransmitting the connection request message is less than a predetermined threshold, prior to the retransmission of the connection request message, and the retransmission of the connection request message and the waiting for the subsequent response message on the downlink shared channel are performed in response to the retry counter being less than the predetermined threshold, and the mobile communication device further enters an idle state in response to the retry counter being equal to or greater than the predetermined threshold.

17. The mobile communication system of claim 13, wherein the mobile communication device further receives a system information broadcast comprising configuration information of the downlink shared channel from the service network, and performs the waiting for the subsequent response message on the downlink shared channel according to the configuration information.

18. The mobile communication system of claim 13, wherein, in response to the subsequent response message being a connection setup message, the mobile communication device further establishes a connection with the service network according to the connection message.

* * * * *